United States Patent [19]

Pappas et al.

[11] 3,816,314

[45] June 11, 1974

[54] BLOCK COPOLYMERS OF UNSATURATED ESTER AND A NITROGEN CONTAINING MONOMER AS V.I. IMPROVING AND DISPERSANT ADDITIVES FOR OILS

[75] Inventors: James J. Pappas, Parsippany; Albert Rossi, Warren, both of N.J.

[73] Assignee: Esso Research and Engineering Company, Linden, N.J.

[22] Filed: May 31, 1972

[21] Appl. No.: 258,384

[52] U.S. Cl. ............................ 252/51.5 A, 252/56 R
[51] Int. Cl. .............................................. C10m 1/32
[58] Field of Search ....................... 252/51.5 A, 56 R

[56] References Cited
UNITED STATES PATENTS

| | | | |
|---|---|---|---|
| 2,613,184 | 10/1952 | Catlin | 252/51.5 A |
| 2,839,512 | 6/1958 | Barnum et al. | 252/51.5 A X |
| 3,251,778 | 5/1966 | Dickson et al. | 252/51.5 A X |
| 3,506,574 | 4/1970 | Stambaugh et al. | 252/51.5 A |

FOREIGN PATENTS OR APPLICATIONS 757,915  9/1956  Great Britain ................. 252/51.5 A

*Primary Examiner*—Patrick P. Garvin
*Assistant Examiner*—Andrew H. Metz

[57] ABSTRACT

Block copolymers comprising an oil-soluble segment and a polar segment exhibit improved dispersancy characteristics in multifunctional viscosity index improver applications.

13 Claims, No Drawings

BLOCK COPOLYMERS OF UNSATURATED ESTER AND A NITROGEN CONTAINING MONOMER AS V.I. IMPROVING AND DISPERSANT ADDITIVES FOR OILS

BACKGROUND OF THE INVENTION

1. Field of the Invention

The present invention relates to oil soluble block copolymers for use as multifunctional viscosity index improvers. More specifically, the invention relates to block copolymers which exhibit improved dispersancy characteristics in multifunctional viscosity improver applications, as compared to corresponding random copolymers of equivalent monomer content.

The present invention also relates to methods of making such block copolymers and to improved lubricating oils containing the new block copolymers.

2. Description of the Prior Art

Commercial multifunctional viscosity index improvers typically have polar groups incorporated into the polymer to provide dispersancy. As far as is known, the polar groups in such known multifunctional viscosity improvers are distributed randomly throughout the polymer. Such polymers are disclosed in e.g. U.S. Pat. Nos. 3,304,260 and 3,522,179. While the random incorporation of a minor amount of an appropriate polar group containing comonomer has provided dispersancy properties to the polymers, in many applications it has not been feasible to effectively eliminate the use of a separate dispersant additive and still obtain the desired level of dispersancy.

It has now been discovered that by bunching the polar groups in the polymer chain (block polymerization of the polar group containing monomer) it is possible to obtain a polymer having superior dispersancy to polymers containing the same polar groups randomly distributed through the polymer. It is believed that with block polymers, the polar segments of the polymer absorb on, for example, engine oil sludge, while the non-polar segments remain in the oil. The concentration of polar functionality in the polymer provides more effective suspension of the sludge and leads to increased dispersancy.

SUMMARY OF THE INVENTION

The copolymers of the present invention can contain blocks of a first comonomer A, and blocks of a second comonomer B which provides a polar function. The copolymers have the structure $(A)_n(B)_m$ wherein the molar ratio of $m:n$ is from 0.25:99.75 to 10:90.

The first comonomer is an acrylate of the formula

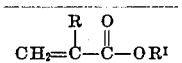

wherein
1. R is hydrogen or a $C_1$ to $C_4$ alkyl group, and
2. $R^I$ is a $C_8$ to $C_{22}$ straight or branched chain alkyl group and usually will be a substantially straight chain alkyl group. The second, polar group containing, comonomer is selected from
a. acrylic compounds of the formula

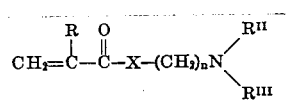

wherein
1. X is oxygen or an -NR- group,
2. $n$ is a whole number from 2 to 5,
3. R is as above; and
4. $R^{II}$ and $R^{III}$ are each $C_1$ to $C_{12}$, preferably $C_1$ to $C_4$, hydrocarbyl groups, e.g., alkyl groups;
b. vinyl pyridines and $C_1$ to $C_5$ alkyl-substituted derivatives thereof;
c. vinyl nitriles of the formula

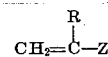

wherein (1) Z is $-CN$, $-O(CH_2)_nN\begin{smallmatrix}R^{II}\\R^{III}\end{smallmatrix}$, or $-NH(CH_2)_nN\begin{smallmatrix}R^{II}\\R^{III}\end{smallmatrix}$, and 2. R, $R^{II}$, $R^{III}$ and $n$ are as above;
d. N-vinyl pyrollidone; and
e. alpha-olefin oxides and alpha-olefin imines of the formula

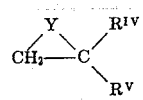

wherein
1. $R^{IV}$ and $R^V$ are each hydrogen, a $C_1$ to $C_{12}$ alkyl group, or a $C_6$ to $C_{10}$ aromatic group,
2. Y is oxygen or $NR^{VI}$, and
3. $R^{VI}$ is hydrogen or a $C_1$ to $C_{12}$ alkyl group.

Any of the various second comonomers may be used in combination. The copolymers of the present invention, having number average molecular weights between about 2,000 and 500,000, and preferably between 50,000 and 200,000, exhibit excellent properties as multifunctional viscosity index improvers. These molecular weights can be determined by multiplying the degree of polymerization (as defined herein below) by the monomer molecular weight.

The present invention also includes lubricating oil compositions which comprise a major portion of a lubricating oil and from about 0.5 percent to about 5 percent, and preferably 1.5 percent to about 2.5 percent by weight, based on the total weight of the lubricating oil composition, of a nitrogen-containing block copolymer as described above. Incorporation of the block copolymers of the present invention into lubricating oils in the prescribed amounts contributes to a high viscosity index and provides outstanding dispersancy. The block copolymers of the present invention have better dispersancy characteristics in multifunctional viscosity index improver applications than corresponding random copolymers containing equivalent amounts of comonomers. Concentrates of 5 to 25 wt. percent of said copolymer in mineral oil diluent can also be formed for ease of handling and blending.

The block copolymers of the present invention preferably may be prepared by anionic polymerization at low temperatures. The first comonomer is polymerized, in a solvent and in the presence of an anionic catalyst, for a period of time, and then the second monomer is added to the reaction solution.

DETAILED DESCRIPTION OF THE INVENTION

It has now been found in accordance with the invention that highly effective, multifunctional viscosity improvers with improved dispersant action can be prepared by block polymerization of a first acrylic comonomer A, and a second nitrogen-containing comonomer B. The homopolymer blocks of the copolymers of this invention desirably have a chain length of at least about 10 monomeric units. The length and number of the homopolymer blocks present in the block copolymer of the present invention can be varied, and the selection and arrangement of the blocks can also be varied.

The first comonomer A is selected from acrylates having the formula

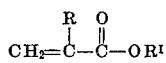

wherein R is hydrogen or a $C_1$ to $C_4$ alkyl group and $R^I$ is a $C_8$ to $C_{22}$ alkyl group. Preferably, the acrylate as defined above, is a methacrylate, and the $R^I$ substituent is a $C_8$ to $C_{18}$ substantially straight chain alkyl group. By substantially straight chain alkyl group is meant an alkyl group having no more than 25 percent of the carbon atoms in side branches off the main chain. Specific examples of compounds which may be employed as the first comonomer A include 2-ethylhexyl methacrylate, lauryl methacrylate, stearyl methacrylate, octadecyl acrylate, n-dodecyl methacrylate, etc. Esters of both naturally occurring and synthetic alcohols can be used as well as mixtures of the above noted monomers.

The second comonomer B may be selected from any of a broad group of nitrogen-containing monomers. The preferred comonomers are selected from the acrylic compounds of the formula

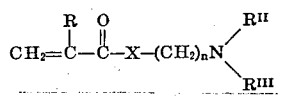

wherein X is oxygen or an -NR- group, n is a whole number from 2 to 5, R is as above, and $R^{II}$ and $R^{III}$ are each $C_1$ to $C_{12}$ alkyl group. The various R groups may be the same or different. Methacrylates such as dialkylaminoethylmethacrylates are particularly preferred comonomers.

Specific examples of compounds which may be employed as the second comonomer B include dimethylaminoethyl methacrylate, diethylaminopropyl methacrylamide, di (isobutyl) aminoethyl methacrylate, methylisobutylaminopropyl acrylate, 4-vinyl pyridine, alpha methacrylonitrile, ethylene imine, N-vinyl pyrrolidone, etc. Combinations of various suitable second comonomers B can be copolymerized with the homopolymeric blocks of monomer A. The resultant multicomponent polymers exhibit the highly polar blocks and dispersancy achieved by the use of a single comonomer B.

The block copolymers of the present invention may be conveniently prepared by anionic polymerization. This method of polymerization offers certain unique advantages which may be extremely useful in the synthesis of the polymers of the present invention. In particular, by the use of anionic polymerization, it is possible to obtain polymers having a narrow molecular weight distribution and to control the microstructure of the polymer. Furthermore, anionic polymerization is particularly well adapted for the production of block polymers. The polymerization may be carried out in the presence of known anionic polymerization catalysts, such as sodium, potassium, Grignard reagents, sodium triphenylmethane, sodium naphthalene, sodium biphenyl, benzophenone, lithium alkyls, etc. The preferred catalysts are lithium alkyls such as n-propyllithium, isopropyllithium, n-butyllithium, ter.-octyllithium, n-decyllithium. Particularly preferred is tertiary-butyllithium.

The amount of catalyst employed primarily depends upon the degree of polymerization desired. The term "degree of polymerization," as employed herein, means the total number of monomeric units present in the polymer. Ordinarily, each mole of organo-lithium catalyst will generate a mole of polymer. Thus, "degree of polymerization" may be conveniently defined by the generalization:

$$\text{Degree of Polymerization} = \frac{\text{Total Moles of Monomer}}{\text{Moles of Organo-Lithium Catalyst}}$$

Since to obtain the desired molecular weights, the average number of monomeric units in the polymer will generally be about 100 to 3,000, about 0.5 to 5.0 mole of organo-lithium catalyst, per mole of monomer will ordinarily be utilized.

The polymerization may be conveniently carried out in an inert, anhydrous organic solvent. By "inert" it is meant that the solvent does not react with the monomers or the polymers. The inert solvent will generally be free of olefinic unsaturation and contain from 4 to 15 carbon atoms. Preferred solvents include toluene, tetrahydrofuran, ethyl ether, and mixtures thereof. Other suitable solvents include aliphatics, such as n-pentane, n-hexane, isooctane, -nomane, etc.; alicyclics, such as cyclopentane, cyclohexane, cycloheptane, etc.; and aromatics, such as benzene, xylene, chlorobenzene, etc.

The amount of solvent employed is not critical, any convenient amount may be employed. Preferably, 0.1 to 1.0 liters of solvent are employed per gram mole of monomers. Before use, the solvent is preferably dried over a desiccant such as calcium hydride.

The polymerization reaction generally takes place at about −70° to 0° C, and preferably at −50° to −20° C. Reaction times of 1 hour to 8 hours may be conveniently employed. Reaction pressure is not critical; pressures may range from atmospheric to superatmospheric. Preferably, for economy and ease of handling, atmospheric pressure is employed.

The copolymers may be conveniently prepared by adding a suitable comonomer A in a convenient amount of solvent to a reaction vessel and cooling to the desired reaction temperature. A suitable catalyst is added to the reaction vessel and the first comonomer A is allowed to polymerize while keeping the reaction mixture at the desired temperature. After the first comonomer A is polymerized to the desired extent, a suitable amount of the second comonomer or comonomer B is added and the reaction is allowed to proceed until block copolymers of the desired molecular weight are obtained.

The block copolymers can be recovered by procedures well known in the art. A typical technique would be to add an alcohol, such as methanol, to the reaction mixture to terminate the reaction, warm the reaction mixture to room temperature, and pour the mixture into additional methanol to precipitate the block copolymer. The solvents can be decanted and the precipitated polymer washed with methanol. The polymer may be purified by dissolving in an aromatic solvent such as benzene, reprecipitating by the addition of methanol, decanting the solvents, and drying the polymer.

The block polymers of the present invention comprise from about 99.75 to about 90 mole percent of the first comonomer A units and from about 0.25 to about 10 mole percent of the second comonomer B units. Preferably the molar ratio of the first comonomer A to the second comonomer B lies between 99:1 to 95:5. In preparing the polymers, an excess of the second comonomer B should be used over the amount of comonomer B units desired in the polymer. It has been found that in the block copolymers only part of the second comonomer B enters the block copolymer. The amount of excess to be employed, of course, depends upon the specific reaction conditions and the specific monomers employed. Normally, at least a 2.5 fold excess of comonomer B would be employed. In other words, if it was desired to prepare a block copolymer containing 5 mole percent of comonomer B, at least 12.5 moles of comonomer B would be employed in the reaction solution for every 100 moles of copolymer A employed.

The block copolymers of the present invention can be used as multifunctional viscosity index improvers in lubricating oils in amounts of about 0.5 to 5.0 weight percent, and preferably about 1.5 to about 2.5 weight percent, based upon the total weight of the treated oil. By bunching the dispersant groups in the polymer chain (block polymerization of the nitrogen-containing monomers), the polymers have dispersant and nondispersant segments. The dispersant segments adsorb on the sludge and the nondispersant segments stick in the oil, whereby a more effective suspension of the sludge is obtained.

DESCRIPTION OF THE PREFERRED EMBODIMENTS

The following examples will serve to illustrate methods of preparing and using the copolymers of the present invention, and include preferred embodiments of the invention.

EXAMPLE 1

Toluene and tetrahydrofuran were refluxed over $CaH_2$ for 2 hours and distilled. 2-ethylhexyl methacrylate was dried overnight over $CaH_2$, filtered in a dry box and distilled at 0.1 mm Hg pressure and a temperature of 46° C. The distillation set up was flamed under vacuum.

Diethylaminoethyl methacrylate was kept overnight over $CaH_2$, filtered and distilled at 0.1 mm Hg pressure and a temperature of 40° C.

A 500 ml four-necked flask with a stirrer, thermometer, attachment with a septum, and a stopper was washed thoroughly and dried in an oven at about 110° C. All the equipment was transferred to a dry box and assembled. With the equipment still in the dry box, the stopper was removed and 38 ml (33.4g) of 2-ethylhexylmethacrylate in 60 ml of the anhydrous toluene and 60 ml of the anhydrous tetrahydrofuran were added to the flask. The stopper was put back on and the apparatus was taken out of the dry box and placed in a hood. Nitrogen was immediately inserted into the flask above the reaction mixture. The stirrer was attached and the reactants were cooled to −35° C. A syringe was charged in the dry box with 1.20 ml (1.24 M) of t-butyllithium and the t-butyllithium was added to the reaction flask through the septum.

The reaction mixture was kept at −35° C for 2 hours, at which time 1.76 g. of diethylaminoethyl methacrylate was added to the reaction flask through the septum with a syringe. The reaction mixture was kept at −35° C for 2 more hours and then a small amount of methanol was added through the septum with a syringe. The mixture was warmed to room temperature, poured into 2 liters of methanol, and the solvents decanted. The precipitated polymer washed twice with methanol, dissolved in 200 ml of benzene, reprecipitated in 2 liters of methanol, and dried at 95° C and a pressure of 1.0 mm Hg. After reprecipitation and drying, 30 g. (a yield of 85 percent by weight) of the polymer was obtained. The resultant polymer was shown by analysis to contain 0.17 percent by weight nitrogen.

In the following examples blends of the copolymers of this invention were made by heating the copolymers with the oil to a temperature of 120 to 150°F while mildly agitating the mixture.

EXAMPLE 2

Laboratory multiple oxidation tests (LMOT) were run on a lubricating oil containing a small amount of the polymer of Example 1. The laboratory multiple oxidation tests were also run, for comparative purposes, on a lubricating oil containing the same amount of a random 2-ethylhexylmethacrylate and diethylaminoethyl methacrylate copolymer having a similar molecular weight and an equivalent nitrogen content. The random copolymer was prepared under substantially identical conditions as the block copolymer of Example 1, except that both comonomers were added to the reaction vessel at the same time. In the laboratory multiple oxidation test, a 40 g. sample was prepared consisting of a lubricating oil into which about 0.1 percent by weight of the block copolymer of Example 1 had been incorporated. A second 40 g. sample was prepared consisting of the same lubricating oil into which an equal amount of the corresponding random copolymer had been incorporated. A 19-inch piece of No. 14 gauge copper wire, 2.5 g. of iron filings, and a sanded aluminum strip (12 inches × ¼ inch × 1/16 inch) were added to each composition as catalysts. Air at the rate of 25 cc per minute was bubbled through the samples, while maintaining their temperature at 300° F. Each day a drop of oil was placed on blotter paper and the homogenity of the spot observed to it spread. When the oil spread non-homogeneously, leaving a residue of sludge, the oil was said to "break." Thus the days to LMOT break reflects the number of days the additive protected the oil from sludge formation. The results obtained are summarized in Table 1.

Table 1

| Type of Polymer | % Nitrogen | LMOT (days to break) |
| --- | --- | --- |
| Block copolymer of Example 1 | 0.17 | 6 |
| Corresponding random copolymer | 0.20 | 5 |

Table 1 illustrates that the block copolymers of this invention improve the thermal oxidation stability of lubricating oils.

EXAMPLE 3

Various compounds of lubricating oil with block copolymers of the present invention and corresponding random copolymers were subjected to a sludge dispersancy bench (SIB) test. This test has been found to be an excellent screening test for lubricating oil dispersant additives.

In the sludge dispersancy bench test, the medium chosen for the sludge test was a used oil (original viscosity about 325 SUS at 100° F) that had been run for 2,500 miles in a fleet of taxicabs in New York City. This original oil contained only 1.5 weight percent of zinc di (isobutyl) dithiophosphate as an additive. After being used for 2,500 miles of engine operation it contained a fine dispersion of actual engine sludge.

The used oil is placed in centrifuge tubes and centrifuged in a conventional manner for about one-half hour. The supernatant oil is recovered and used to prepare blends with various additives, including the block copolymers of the present invention. The blends are prepared by merely mixing approximately 10 g. supernatant oil with minor amounts of additives and heating on a steam bath or hot plate until all the additives have dissolved. The blends, as well as blanks containing the supernatant oil only, are poured into preweighed centrifuge tubes and heated at 280° F for 16 hours. The various samples are centrifuged for about 30 minutes, after which the supernate is poured off. The tubes are inverted and the excess oil is allowed to drain for 10 to 15 minutes. The oil is rinsed from the walls of the tube with 25 cc of pentane, taking care to disturb the sludge as little as possible. Any disturbed sludge is spun down (5–10 minute spin in the centrifuge) and the pentane solution poured off. The sludge is thoroughly rinsed by attempting to dissolve the sludge in pentane with the aid of a wash bottle. The resultant sludge — pentane slurry is centrifuged for 15 to 20 minutes and the pentane decanted off. This process may liquify some of the sludge so care must be taken to not pour any of the block liquid out of the centrifuge tube. The outside of the tube is washed with acetone and allowed to air dry to a constant weight (about 1 hour). The sludge is then weighed. The weight of the sludge found with each each additive-oil sample is divided by the weight of the sludge in the blank and the resulting gratient multiplied by 10 to give mg. of sludge per 10 mg. of sludge of blank. The various blends of used oil and polymers gave the results shown in Table II.

As may be seen from the viscosity data for Control A and Example 1, the block copolymers of the present invention are equally effective as viscosity improvers when compared to corresponding random copolymers. The viscosities at 210° and 0° F of both these oils meet the specifications for a low 30 multigraded oil set forth in SAE specification J–300A. However, the block copolymers of the present invention are substantially superior as dispersing agents for sludge compared to corresponding random copolymers.

The polymers of the present invention may be used as a sole oil additive, or in combination with other conventional oil additives, such as pour point depressants, corrosion inhibitors, antioxidants, sludge inhibitors, etc.

The present invention in its broader aspects is not limited to the specific details shown and described, and departures may be made from such details without departing from the principles of the invention and without sacrificing its chief advantages.

What is claimed is:

1. An oil additive useful as a multifunctional V.I. improver with dispersancy properties, which is an oil soluble block copolymer having a molecular weight in the range of about 2,000 to 500,000 of A. blocks of a first comonomer A of the formula

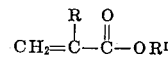

1. R is hydrogen or a $C_1$ to $C_4$ alkyl group and
2. $R^I$ is a $C_8$ to $C_{22}$ substantially straight chain alkyl group, and B. blocks of at least one second comonomer B selected from the group consisting of
1. acrylic compounds of the formula

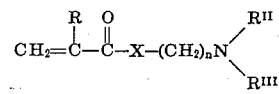

Table II
BLOCK AND RANDOM ANIONIC COPOLYMERIZATION OF METHACRYLATES

| Item | Monomers [1] | Mole percent t-BuLi | Percent yield [2] | Approx. Molec. Wt. [3] | Percent N | KV at 210°F. cs. [4] | Vis. at 0°F. poise [5] | SIB Test Conc. (g. of polymer/10 g. of used oil) | SIB Test Sludge (mg./ 10 mg. in blank) |
| --- | --- | --- | --- | --- | --- | --- | --- | --- | --- |
| Control A | 2-EHMA/DEAEMA (95/5, Random) | 0.83 | 94 | 24000 | 0.20 | 9.35 | 17.2 | 0.10 | 13.0 |
|  |  |  |  |  |  |  |  | .26 | 23.0 |
| Example 1 | 2-EHMA/DEAEMA (98/2, Block) | 0.83 | 85 | 24000 | 0.17 | 9.79 | 17.0 | .10 | 9.9 |
|  |  |  |  |  |  |  |  | .26 | 8.1 |
|  |  |  |  |  |  |  |  | .50 | 5.5 |
| Control B | LMA/DEAEMA (99/1, Random) | 2.87 | 85 | 8400 | 0.11 | 9.91 |  | .10 | 10.0 |
|  |  |  |  |  |  |  |  | .50 | 8.1 |
| Example 2 | LMA/DEAEMA (99/1, Block) | 2.87 | 81 | 8400 | 0.09 | 9.46 |  | .10 | 9.6 |
|  |  |  |  |  |  |  |  | .50 | 4.7 |

[1] 2-EHMA=2-ethylhexyl methacrylate; LMA=lauryl methacrylate; DEAEMA-diethylaminoethyl methacrylate.
[2] Random copolymers run at −35°C for 4 hours; with block polymers polymerized first 2-EHMA or LMA for 3 hours at −35°C then added DEAEMA and kept at −35°C for 1 hour.
[3] Calculated from moles of monomer divided by moles of catalyst.
[4] 2 grams polymer in 98 grams S15ON, a solvent extracted paraffinic type oil having a viscosity of about 5.2 cs. at 210°F AND ¼+)⅜ CS) at 100°F. The KV was determined according to the method described in ASTM D-445.
[5] The viscosity at 0°F was determined by the method described in ASTM D-2602 wherein
   a. X is oxygen or an -NR- group
   b. n is a whole number from 2 to 5,
   c. R is hydrogen or a $C_1$ to $C_4$ alkyl group, and
   d. $R^{II}$ and $R^{III}$ are each $C_1$ to $C_{12}$ hydrocarbyl groups;
  2. vinyl pyridines and $C_1$ to $C_5$ alkyl-substituted derivatives thereof;
  3. alpha-olefin oxides and alpha-olefin imines of the general formula

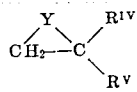

wherein
   a. Y is oxygen or $NR^{VI}$,
   b. $R^{IV}$ and $R^V$ are each hydrogen, a $C_1$ to $C_{12}$ alkyl group, or a $C_6$ to $C_{10}$ aromatic group, and
   c. $R^{VI}$ is a hydrogen or a $C_1$ to $C_{12}$ alkyl group; and
  4. combinations thereof, wherein the units derived from the first comonomer A and the second comonomer B are in blocks so as to yield a polymer of the structure $(A)_n (B)_m$ where the molar ratio of m:n lies between 0.25:99.75 to 10:90.

2. The additive of claim 1, in which the polymer includes blocks formed by polymerizing a first comonomer A of the formula

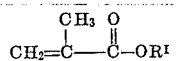

and wherein $R^I$ is a $C_8$ to $C_{16}$ alkyl group.

3. The additive of claim 2, in which the polymer includes blocks formed by polymerizing a second comonomer B selected from acrylic compounds of the formula

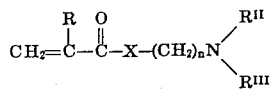

wherein X is oxygen or an -NR- group, n is 2 to 5, R is hydrogen or a $C_1$ to $C_4$ alkyl group, and $R^{II}$ and $R^{III}$ are each $C_1$ to $C_{12}$ hydrocarbyl groups.

4. The additive of claim 3, in which the polymer includes blocks formed by polymerizing a second comonomer B which is a dialkylaminoethyl methacrylate.

5. The additive of claim 4, in which the polymer consists essentially of blocks of polymerized 2-ethylhexyl methacrylate and blocks of polymerized diethylaminoethyl methacrylate.

6. The additive of claim 3, in which the polymer consists essentially of blocks of polymerized lauryl methacrylate and blocks of polymerized diethylamino methacrylate.

7. The additive of claim 3, in which the copolymer has a molecular weight within the range of about 50,000 to 500,000.

8. A lubricating composition comprising
  A. a major proportion of a lubricating oil, and
  B. about 0.5 to 5 wt. percent of a block copolymer of
    1. blocks of a first comonomer A of the formula

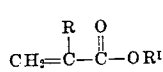

wherein
   a. R is hydrogen or a $C_1$ to $C_4$ alkyl group, and
   b. $R^I$ is a $C_8$ to $C_{22}$ alkyl group, and
    2. blocks of at least one comonomer B selected from the group consisting of
     a. acrylic compounds of the formula

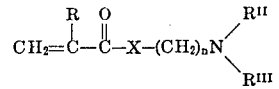

wherein
   i. X is oxygen or an -NR- group,
   ii. n is a whole number from 2 to 5,
   iii. R is hydrogen or a $C_1$ to $C_4$ alkyl group, and
   iv. $R^{II}$ and $R^{III}$ are each $C_1$ to $C_{12}$ hydrocarbyl groups;
  b. vinyl pyridines and $C_1$ to $C_5$ alkyl-substituted derivatives thereof;
  c. alpha-olefin oxides and alpha-olefin imines of the general formula

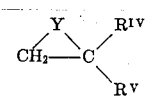

wherein
   i. Y is oxygen or $NR^{VI}$,
   ii. $R^{IV}$ and $R^V$ are hydrogen, a $C_1$ to $C_{12}$ alkyl group, or a $C_6$ to $C_{10}$ aromatic group, and
   iii. $R^{VI}$ is hydrogen or a $C_1$ to $C_{12}$ alkyl group; and
  d. combinations thereof, wherein the units derived from the first comonomer A and the second comonomer B are in blocks so as to yield a polymer of the structure $(A)_n (B)_m$ where the molar ratio of m:n lies between 0.25:99.75 to 10:90.

9. The lubricating composition of claim 8, in which the block copolymer includes blocks formed by polymerizing a first comonomer A of the formula

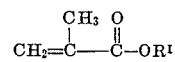

wherein $R^I$ is a $C_8$ to $C_{16}$ alkyl group.

10. The lubricating composition of claim 9, in which the block copolymers includes blocks formed by polymerizing a second comonomer B selected from acrylic compounds of the formula

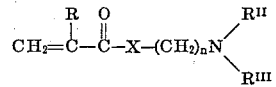

wherein X is oxygen or an -NR- group, n is 2 to 5, R is hydrogen or a $C_1$ to $C_4$ alkyl group, and $R^{II}$ and $R^{III}$ are each $C_1$ to $C_{12}$ hydrocarbyl groups.

11. The lubricating composition of claim 10, in which the polymer includes blocks formed by polymerizing a second comonomer B which is a dialkylaminoethyl methacrylate.

12. The lubricating composition of claim 11, in which the polymer comprises blocks of polymerized 2-ethylhexyl methacrylate and blocks of polymerized diethylaminoethyl methacrylate.

13. The lubricating composition of claim 11, wherein said copolymer contains blocks of polymerized lauryl methacrylate and diethylaminoethyl methacrylate.

* * * * *